(12) United States Patent
Sanz (10) Patent No.: US 11,710,393 B2
(45) Date of Patent: Jul. 25, 2023

(54) MOBILE VIDEO SECURITY DEVICE CONFIGURED FOR STREAMING VIDEO VIA WIRELESS BROADBAND AND PROCESS FOR IMPLEMENTING THE SAME

(71) Applicant: TracFone Wireless, Inc., Miami, FL (US)

(72) Inventor: Raul Sanz, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 155 days.

(21) Appl. No.: 17/199,622

(22) Filed: Mar. 12, 2021

(65) Prior Publication Data

US 2021/0287505 A1    Sep. 16, 2021

Related U.S. Application Data

(60) Provisional application No. 62/988,614, filed on Mar. 12, 2020.

(51) Int. Cl.
*G08B 13/196* (2006.01)
*H04N 7/18* (2006.01)
*H04W 12/06* (2021.01)

(52) U.S. Cl.
CPC . *G08B 13/19684* (2013.01); *G08B 13/19602* (2013.01); *G08B 13/19658* (2013.01); *G08B 13/19682* (2013.01); *H04N 7/186* (2013.01); *H04W 12/06* (2013.01)

(58) Field of Classification Search
CPC ........ G08B 13/19684; G08B 13/19602; G08B 13/19658; G08B 13/19682; H04N 7/186; H04N 7/183; H04W 12/06; H04L 67/75; H04L 67/12
See application file for complete search history.

(56) References Cited

U.S. PATENT DOCUMENTS

| | | | |
|---|---|---|---|
| 2014/0375457 A1* | 12/2014 | Diaz | G16H 40/20 222/39 |
| 2016/0358436 A1* | 12/2016 | Wautier | G11B 27/102 |
| 2018/0041735 A1* | 2/2018 | Vagelos | H04N 7/185 |
| 2019/0025822 A1* | 1/2019 | Sentosa | G08G 5/0013 |
| 2019/0244505 A1* | 8/2019 | D'Angelo | H04N 7/188 |
| 2021/0044782 A1* | 2/2021 | Clack | B60R 25/1004 |

* cited by examiner

*Primary Examiner* — Jared Walker (57) ABSTRACT

A mobile video surveillance device includes a camera device configured to capture video images; a transceiver configured to transmit and stream the video images over a network to a video receiving computer for at least one of the following: viewing on a display, viewing on a wireless device, or storage in a database; a video capturing input device configured to receive an input to initiate operation of the camera device and initiate video streaming by the transceiver; a processor configured to control the camera device and the transceiver based on the video capturing input device; a housing configured to house the camera device, the transceiver, the video capturing input device, and the processor; and a movement detection unit configured to detect a movement.

22 Claims, 6 Drawing Sheets

MOBILE VIDEO SECURITY DEVICE CONFIGURED FOR STREAMING VIDEO VIA WIRELESS BROADBAND AND PROCESS FOR IMPLEMENTING THE SAME

CROSS-REFERENCE TO RELATED APPLICATIONS

This application claims the benefit from U.S. Provisional Application No. 62/988,614 filed on Mar. 12, 2020, which is hereby incorporated by reference in its entirety for all purposes as if fully set forth herein.

BACKGROUND OF THE DISCLOSURE

1. Field of the Disclosure

This disclosure relates generally to a mobile video security device configured for streaming video via wireless broadband. This disclosure also relates generally to a process for implementing a mobile video security device configured for streaming video via wireless broadband.

2. Related Art

Home security systems and devices have recently gained much popularity. These home security systems are typically placed at a front door of a home and typically operate to capture video of people approaching the front door of the home.

However, these home security systems and devices require a connection to a wireless fidelity network typically implemented within the home in order to operate including the ability to transmit the captured video. However, many homes do not implement a wireless fidelity network or the wireless fidelity network implemented by the home may not be able to connect to the home security system and device. For example, an access point providing the wireless fidelity network may not reach or otherwise serve a location where the home security system and device is located. Moreover, these home security systems and devices are not mobile as they need to make a connection to the wireless fidelity network. Utilizing these home security systems and devices away from a home is not possible as there may not be a wireless fidelity network that is easily connected to.

Accordingly, there is a need for a mobile video surveillance system configured to provide operation in any location.

SUMMARY OF THE DISCLOSURE

The foregoing needs are met, to a great extent, by the disclosure, with a process and device for implementing a mobile video surveillance system and process to implement a mobile video surveillance system.

One aspect includes a mobile video surveillance device that includes: a camera device configured to capture video images; a transceiver configured to transmit and stream the video images over a network to a video receiving computer for at least one of the following: viewing on a display, viewing on a wireless device, or storage in a database; a video capturing input device configured to receive an input to initiate operation of the camera device and initiate video streaming by the transceiver; a processor configured to control the camera device and the transceiver based on the video capturing input device; a housing configured to house the camera device, the transceiver, the video capturing input device, and the processor; a movement detection unit configured to detect a movement, the movement detection unit and the processor configured to determine specific movement; and the video capturing input device configured to be responsive to the movement detection unit detecting the specific movement to initiate operation of the camera device and initiate video streaming by the transceiver in response to operation of the video capturing input device.

One aspect includes a process of implementing a mobile video surveillance device that includes: capturing video images with a camera device; transmitting and streaming the video images over a network to a video receiving computer with a transceiver for at least one of the following: viewing on a display or storage in a database; receiving an input to initiate operation of the camera device and initiate video streaming by the transceiver with a video capturing input device; controlling the camera device and the transceiver with a processor based on the video capturing input device; detecting a movement with a movement detection unit, the movement detection unit and the processor configured to determine specific movement; and operating the camera device and initiate video streaming by the transceiver in response to operation of the video capturing input device, the video capturing input device configured to be responsive to the movement detection unit detecting the specific movement to initiate; and arranging the camera device, the transceiver, the video capturing input device, and the processor in a housing, where the video capturing input device that includes an input device configured as at least one of the following: a button arranged on the housing and a touchscreen arranged in a display of the housing.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

A mobile video surveillance device may connect to a "wireless network" or "network" that are intended to encompass any type of wireless network to obtain wireless services through the use of a mobile video surveillance device, such as a Global System for Mobile Communication (GSM) network, a Code-Division Multiple Access (CDMA) network implementing GSM/EDGE (Enhanced Data rates for GSM Evolution (EDGE) (also known as Enhanced GPRS (EGPRS)) and UMTS/HSPA (Universal Mobile Telecommunications System/High Speed Packet Access) network technologies, a Long Term Evolution (LTE) network, a 5G (5th generation mobile networks or 5th generation wireless systems) network, a WiMAX (Worldwide Interoperability for Microwave Access) network, a HSPA+ (Evolved High Speed Packet Access) network, a W-CDMA (Wideband Code-Division Multiple Access) network, a CDMA2000 (also known as C2K or IMT Multi-Carrier (IMT-MC)) network, Wireless Fidelity (Wi-Fi) network, Bluetooth, a communication channel as defined herein, or the like, and/or a combination of two or more thereof, that may utilize the teachings of the present application to allow a mobile video surveillance device to connect to a wireless network to stream the video in real time. In particular, the mobile video surveillance device of the disclosure may stream video utilizing wireless broadband data service on the wireless network that has few geographic limitations.

Reference in this specification to a wireless device is intended to encompass devices such as smartphones, mobile phones, tablet computers, MP3 players, Internet of things (IoT) device and the like. Reference to a wireless device is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless device," "wireless handset," "handset," "mobile device," "device," "mobile phones," "mobile equipment," "mobile station," "user equipment," "cellular phone," "smartphones," or "phone." The wireless device may connect to a "wireless network" or "network" as described herein.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

The disclosure sets forth a mobile video surveillance system that is configured to stream video in real time in any location to individuals or entities such that these individuals or entities may take appropriate action based on the content of the video. In this regard, the mobile video surveillance system set forth in the disclosure may deter crime and/or identify individuals involved in criminal behavior like theft, vandalism, and/or the like. Moreover, the mobile video surveillance system in some aspects may be automatic based on environmental sounds and actions sensed by the mobile video surveillance device. Additionally, the mobile video surveillance system may be remotely actuated, which is beneficial as the user of the mobile video surveillance device may not always be in a position to initiate video streaming. Moreover, the mobile video surveillance system of the disclosure may stream video to a remote location which results in a more robust storage of the video content which is not subject to loss if the mobile video surveillance device is damaged, stolen, lost, or the like. Additionally, the mobile video surveillance system of the disclosure may stream video utilizing broadband wireless data service that has few geographic limitations.

Figure 1:
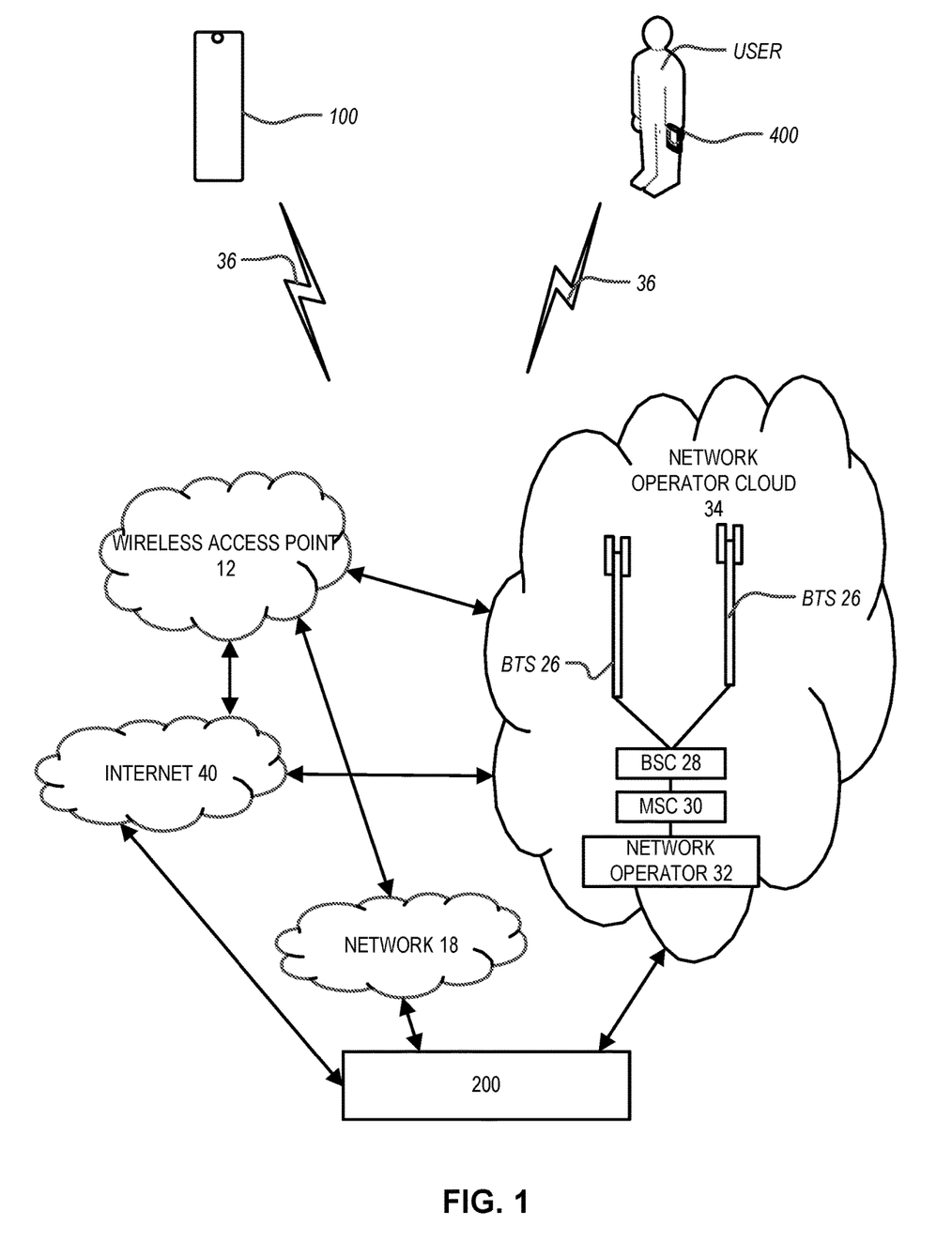
FIG. 1 illustrates an exemplary mobile video surveillance system with associated components connecting to various network components, in accordance with aspects of the present disclosure.

FIG. 1 illustrates an exemplary mobile video surveillance system with associated components connecting to various network components, in accordance with aspects of the present disclosure.

In particular, FIG. 1 illustrates a mobile video surveillance device 100 and a network operator cloud 34. The mobile video surveillance device 100 may be attached or otherwise located in any one of a number of locations, places, positions, localities, and/or the like as desired by user (hereinafter "locations"). For example, the mobile video surveillance device 100 may be located within a personal vehicle, a commercial vehicle including shipping trucks, small parcel trucks, and the like, a hotel room, an office, a home, a business, a garage, a vacation home, a storage facility, a shed, any location on a property, and/or the like. Moreover, the mobile video surveillance device 100 can be held and/or carried by the user. In particular, mobile video surveillance device 100 of the disclosure may stream video utilizing wireless broadband data service on the wireless network that has few geographic limitations.

For example, the mobile video surveillance device 100 may include structure to be mounted to any one of the above noted locations. The mobile video surveillance device 100 may include a mounting structure for mounting to any one of the above noted locations and positioned to capture video and/or audio. The mounting structure may include suction cups, Velcro, clips, brackets, magnetic components, and/or the like. Alternatively, the mobile video surveillance device 100 may include a stand, legs, a flat surface, and/or the like configured to be located in any one of the above noted locations and positioned to capture video and/or audio.

When located in such a manner, the mobile video surveillance device 100 provides a first-person perspective view and captures video with a camera device 126 and streams the video of this view as further described below. In particular, the mobile video surveillance device 100 is configured to capture video events associated with the location and stream the video over a communication channel 36, as defined herein, to a surveillance system 200 that may include a video stream receiving computer 210 and/or the wireless device 400. In one aspect, the video stream receiving computer 210 may be implemented by a server. The network may include a network operator cloud 34, the Internet 40, a network associated with a wireless access point 12, and/or other networks 18. Only one network is necessary for operation of the mobile video surveillance device 100. However, multiple networks are contemplated as well to provide improved coverage. In particular, the mobile video surveillance device 100 may be configured to connect to a broadband wireless network, which have broad coverage and few geographical limitations.

The network operator cloud 34 may include a base transceiver station 26 (BTS), a base station controller 28 (BSC), and a mobile switching center 30 (MSC) overseen by a network operator 32. The network operator cloud 34 may further and/or alternatively include one or more of a radio access network (RAN), a home Public Land Mobile Network (PLMN), a Mobility Management Entity (MME), a Signaling Gateway (SGW), a home subscriber server (HSS), a public data network (PDN) gateway (PDN GW), an Online Charging System (OCS), a Policy and Charging Rules Function (PCRF), a billing component, a Customer Relationship Management (CRM), and/or the like. Other types of wireless networks utilizing a communication channel as defined herein are contemplated as well. The network operator cloud 34 may communicate with the mobile video surveillance device 100 over a communication channel 36 as defined herein. The network operator cloud 34 may further communicate over the Internet 40 to the surveillance system 200. The use of the network operator cloud 34 may be beneficial to implementation of the mobile video surveillance device 100 as there are few geographical limitations. Anywhere the mobile video surveillance device 100 is located, there is likely access to the network operator cloud 34 to stream video events.

In one aspect, the video stream may be compressed using a video codec such as H.264, HEVC, VP8 or VP9. The H.264 or MPEG-4 Part 10, Advanced Video Coding (MPEG-4 AVC) is a block-oriented motion-compensation-based video compression standard. The High Efficiency Video Coding (HEVC), also known as H.265, is a video compression standard. It supports resolutions up to 8192× 4320, including 8K UHD. The VP8 is a video compression format owned by Google and created by On2 Technologies as a successor to VP7. The VP9 is an open video coding format developed by Google. Other video compression processes are contemplated as well.

In one aspect, encoded audio and video streams may be assembled in a container bitstream such as MPEG-4, FLV, WebM, ASF or ISMA. The MPEG-4 is a method of defining compression of audio and visual (AV) digital data. Uses of MPEG-4 include compression of AV data for web (streaming media) and CD distribution, voice (telephone, videophone) and broadcast television applications. The Flash Video is a container file format used to deliver video over the Internet using Adobe Flash Player version 6 and newer. Flash Video content may also be embedded within SWF files. There are two different video file formats known as Flash Video: FLV and F4V. The audio and video data within FLV files may be encoded in the same manner as they are within SWF files. The F4V file format is based on the ISO base media file format. Both formats are supported in Adobe Flash Player and developed by Adobe Systems. WebM is a video file format. The Advanced Systems Format (ASF) is Microsoft's proprietary digital audio/digital video container format, especially meant for streaming media. ASF is part of the Media Foundation framework. ASF is based on serialized objects which are essentially byte sequences identified by a GUID marker. The Internet Streaming Media Alliance (ISMA) describes payload formats, resolves various options and includes ISMA 1.0, ISMA 2.0, ISMACryp, and the like. Other processes are contemplated as well.

The bitstream may be delivered from the mobile video surveillance device 100 to the surveillance system 200, the wireless device 400, and/or the video stream receiving computer 210 using a transport protocol, such as Adobe's RTMP or RTP. In other aspects, technologies such as Apple's HLS, Microsoft's Smooth Streaming, Adobe's HDS and non-proprietary formats such as MPEG-DASH may enable adaptive bitrate streaming over HTTP. A streaming transport protocol may be used to send video to a cloud transcoding service and Content Delivery Network (CDN), which then use HTTP based transport protocols to distribute the video. The streaming client may interact with the streaming server using a control protocol, such as Multimedia Messaging Service (MMS) or Real Time Streaming Protocol (RTSP). Other transport protocols are contemplated as well. The bitstream may be delivered from the surveillance system 200 and/or the video stream receiving computer 210 to the wireless device 400 using a transport protocol as described above.

In particular, the mobile video surveillance device 100 may be configured to automatically select or may be customized to select a particular video and/or audio compression protocol. In one aspect, the mobile video surveillance device 100 may be configured to automatically select or may be customized to select a low definition video and/or audio compression protocol when connecting to a broadband wireless network to reduce data usage. In one aspect, the mobile video surveillance device 100 may be configured to automatically select or may be customized to select a high definition video and/or audio compression protocol when connecting to a wireless fidelity network. In one aspect, the mobile video surveillance device 100 may be configured to store video and/or audio until connecting to a wireless fidelity network. In one aspect, the mobile video surveillance device 100 may be configured to automatically select or may be customized to select a high definition video and/or audio compression protocol for all transmissions.

Figure 2:
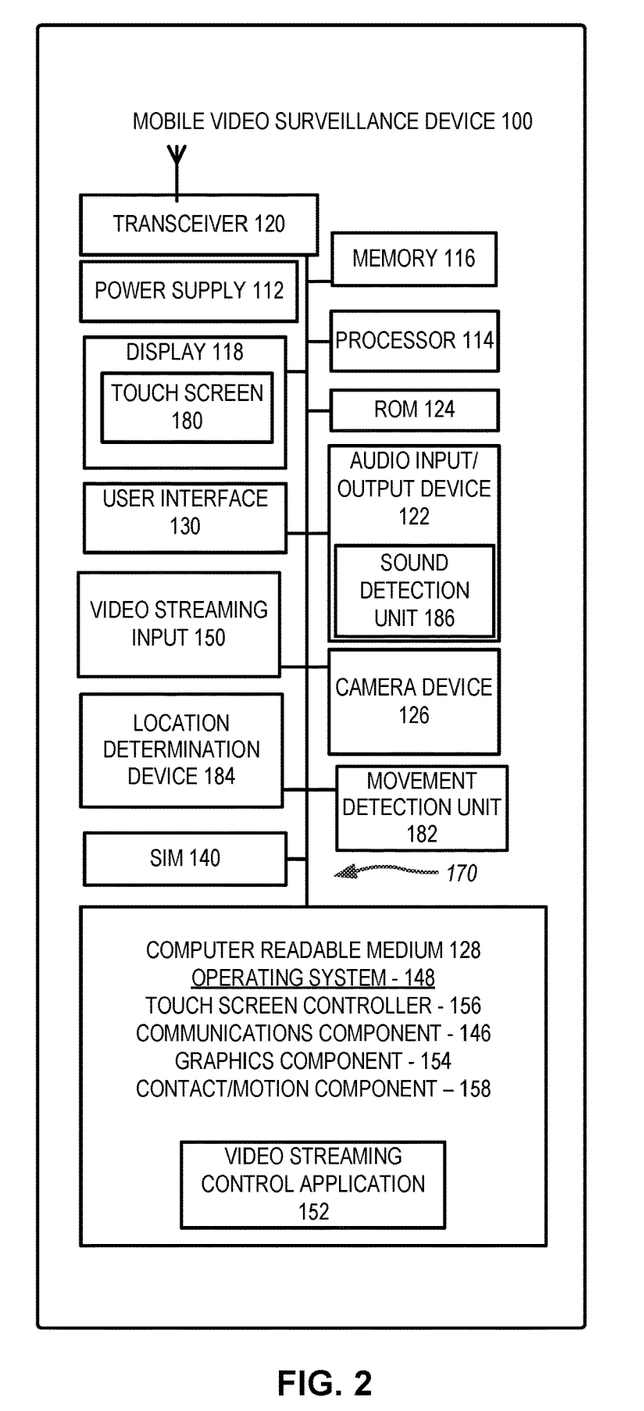
FIG. 2 is a schematic that illustrates the details of an exemplary mobile video surveillance device in accordance with aspects of the disclosure.

FIG. 2 is a schematic that illustrates the details of an exemplary mobile video surveillance device in accordance with aspects of the disclosure.

The mobile video surveillance device 100 may include a processor 114, a memory 116, and the like. The processor 114 may be a central processing unit, microprocessor, dedicated hardware, a chipset, a processor, and/or the like configured to execute instructions including instructions related to software programs.

The memory 116 may include a high-speed random-access memory. Also, the memory 116 may be a non-volatile memory, such as magnetic fixed disk storage, flash memory or the like. The various components of the mobile video surveillance device 100 may be connected through various communication lines including a data bus 170.

Additionally, the mobile video surveillance device 100 may include an audio input/output device 122. The audio input/output device 122 may include speakers, speaker outputs, and in the like, providing sound output; and may include microphones, microphone inputs, and the like, for receiving sound inputs. The audio input/output device 122 may include an analog to digital converter and a digital to audio converter for audio input and output functions respectively.

The mobile video surveillance device 100 may include a transceiver 120 and the like. The mobile video surveillance device 100 may provide radio and signal processing as needed to access a network for services over a communication channel as defined herein. The processor 114 and the transceiver 120 may be configured to process video streaming, call functions, data transfer, and the like and provide other services for the mobile video surveillance device 100. In particular, the transceiver 120 implemented by the mobile video surveillance device 100 of the disclosure may stream video utilizing wireless broadband data service on the wireless network that has few geographic limitations.

In some aspects, the mobile video surveillance device 100 may be implemented utilizing separate components. For example, the mobile video surveillance device 100 may include a hotspot component that includes the transceiver 120 as well as other components as described herein; and the mobile video surveillance device 100 may include a camera component as well as other components as described herein.

Figure 3:
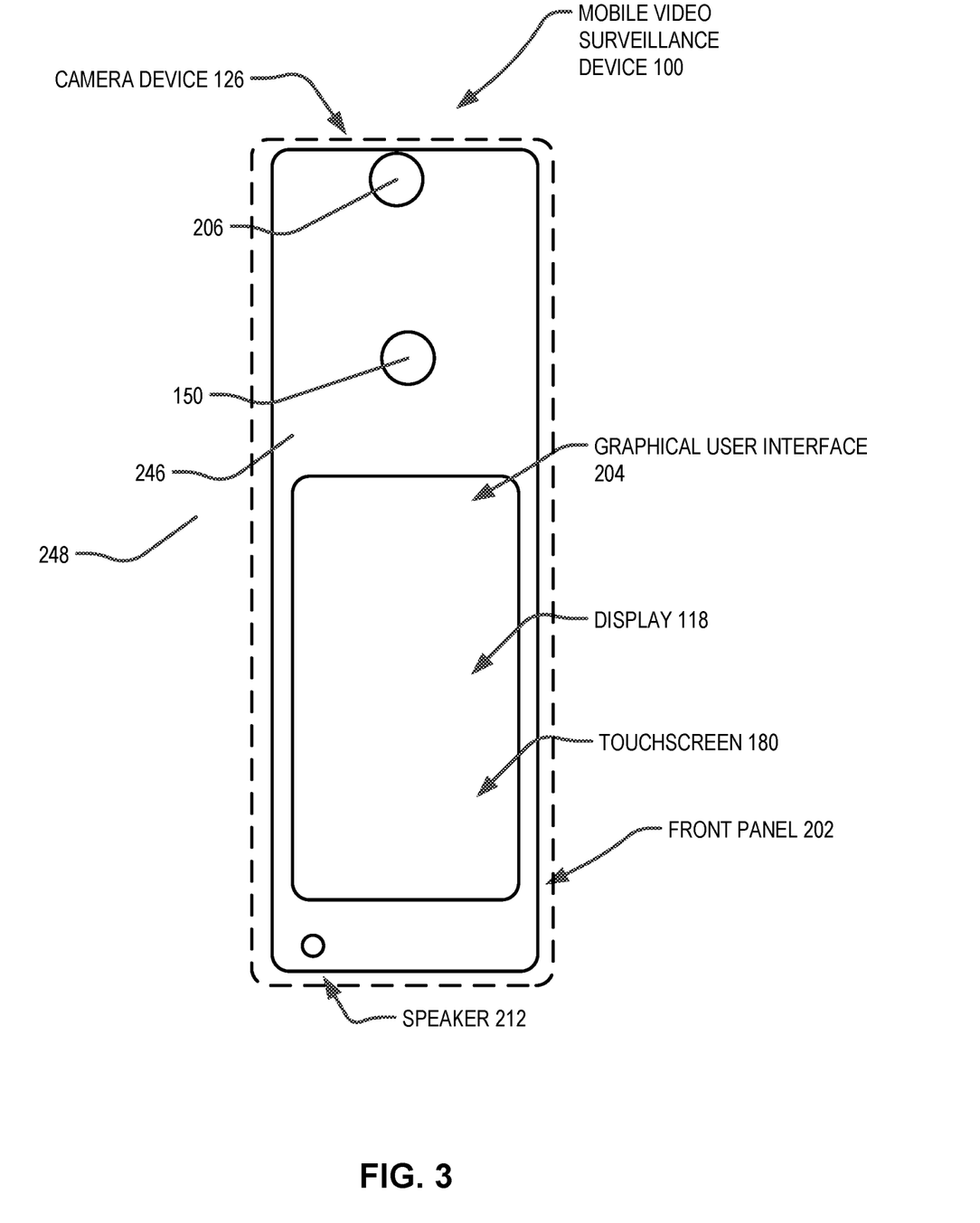
FIG. 3 illustrates a front view of an exemplary mobile video surveillance device in accordance with aspects of the disclosure.

The mobile video surveillance device 100 may include a camera device 126. The camera device 126 can include one or more cameras to provide visual input. The mobile video surveillance device 100 can include, for example, one camera device 126 on the back side of the mobile video surveillance device 100 and another camera device 126 on the front side of the mobile video surveillance device 100. The camera device 126 can also capture video in combination with audio from a microphone of the audio input/output device 122. The camera device 126 may include a charge coupled device (CCD), CMOS image sensors, Back Side Illuminated CMOS, or the like. Images captured by the camera device 126 may be converted and stored in various formats including a JPEG file format, RAW feature format such as the Android (operating system) 5.0 Lollipop, and the like. The camera device 126 may include a lens 206 as shown in FIG. 3. The camera device 126 may include infrared lighting elements and the camera may operate to capture infrared images.

In one aspect, the lens 206 may be configured as a fisheye lens to provide a larger field of view to capture a larger image size. In one aspect, the lens 206 may be configured as with one or more motors operative to change a field of view to capture objects. The one or more motors may be configured with a motor controller, movement mechanisms, and/or the like configured to move the lens 206. In particular, the lens 206 may move in response to a movement detection unit 182 to capture moving objects and/or people. Additionally, the one or more motors, the motor controller, the movement mechanisms, and/or the like may be configured to change a focus of the lens 206.

The camera device 126 may operate in conjunction with a video streaming control application 152. The video streaming control application 152 may be stored in the memory 116, the computer readable medium 128, or the like. The video streaming control application 152 may provide full functionality for the camera device 126 to capture images, convert images into a desired format, stream the video content over a communication channel as defined herein, store the images in the memory 116 or the computer readable medium 128, or the like. The video streaming control application 152 may be configured to change a field of view to capture objects, move the lens 206, change a focus of the lens 206, and/or the like.

In one aspect, the audio input/output device 122 may include microphones, microphone inputs, and the like, for receiving sound inputs. In this aspect, the audio input/output device 122 in conjunction with the video streaming control application 152 may capture sounds related to the video and stream the sounds as well to the surveillance system 200 and/or the video stream receiving computer 210.

The mobile video surveillance device 100 may include a movement detection unit 182. The movement detection unit 182 may include a number of sensors to detect a movement. In particular, the movement detection unit 182 may detect a movement indicating unusual or specific movement (unusual activity) at the location suggesting an event that should be subject to video streaming by the mobile video surveillance device 100.

The movement detection unit 182 may be implemented as a motion detector. The movement detection unit 182 may be implemented with a passive infrared (PIR) sensor, a microwave sensor, an ultrasonic transducer, an electric eye, a tomographic motion detector, and/or the like. The passive infrared (PIR) sensor may be configured to be sensitive to a person's skin temperature through emitted black-body radiation at mid-infrared wavelengths, in contrast to background objects at other temperatures. In particular, the passive infrared (PIR) sensor can detect objects, people, and/or animals based on infrared radiation. In this regard, a skin temperature detection may indicate motion.

The microwave sensor may be configured to detect motion utilizing Doppler radar concepts. In particular, continuous wave of microwave radiation may be emitted from a transmitter, and phase shifts in reflected microwaves due to motion of an object toward (or away from) received by a receiver that result in a heterodyne signal at a low audio frequency. In this regard, a heterodyne detection of the received microwaves may indicate motion.

The ultrasonic transducer may be configured to emit an ultrasonic wave and receive reflections from nearby objects with a receiver. In this regard, a heterodyne detection of the received field may indicate motion.

The electric eye may generate an infrared beam and has a detector to detect the infrared beam. The electric eye may detect a person, object, and/or vehicle that interrupts the visible or infrared beam. In this regard, an interruption detection may indicate motion.

The tomographic motion detector may be configured to generate a mesh network and sense disturbances to radio waves as objects pass from node to node of the mesh network. In this regard, disturbances to radio waves may indicate motion.

Other types of detectors, motion detectors, photodetectors, infrared lighting elements, accelerometers, gyroscopes, and/or the like are contemplated as well for implementation of the movement detection unit 182. Each of these devices can detect objects, people, and/or animals. The video streaming control application 152 may be configured to be responsive to the movement detection unit 182 so as to record video triggered by motion detection.

The movement detection unit 182 may further include analog-to-digital converters, filters, and the like to process the signals associated with any of the sensors. In one aspect, the video streaming control application 152 may implement video streaming when the unusual or specific movement is detected. The data associated with an unusual movement detected by the movement detection unit 182 may be forwarded to the processor 114 in conjunction with the video streaming control application 152. Thereafter, the transceiver 120 may communicate the data associated with unusual movement over a network to the surveillance system 200, the video stream receiving computer 210, and/or the wireless device 400. The video streaming control application 152 may implement various aspects of the disclosure including the mobile video surveillance process 500 illustrated in FIG. 5.

The mobile video surveillance device 100 may include a video stream control input 150. In one aspect, operating the video stream control input 150 may implement the video streaming control application 152 and the associated camera device 126 to start capturing video and stream the video to the surveillance system 200 and/or the video stream receiving computer 210 in response to the movement detection unit 182. For example, a user may place the mobile video surveillance device 100 at the desired location and actuate the video stream control input 150. Thereafter, the mobile video surveillance device 100 may operate in conjunction with the movement detection unit 182 to capture video and stream the video to the surveillance system 200 and/or the video stream receiving computer 210 in response to the movement detection unit 182.

In one aspect, the mobile video surveillance device 100 may be located in a vehicle and the video stream control input 150 may be responsive to the vehicle being parked, which may be determined by no movement detected by the movement detection unit 182 and/or the location determination device 184. Thereafter, the mobile video surveillance device 100 may implement the video streaming control application 152 and the associated camera device 126 to start capturing video and stream the video to the surveillance system 200 and/or the video stream receiving computer 210 in response to the movement detection unit 182. For example, a user may place the mobile video surveillance device 100 at the desired location in their vehicle and may park the vehicle. Thereafter, the mobile video surveillance device 100 may operate in conjunction with the movement detection unit 182 to capture video and stream the video to the surveillance system 200 and/or the video stream receiving computer 210 in response to the movement detection unit 182.

In one aspect, the mobile video surveillance device 100 may be located in a vehicle and the video stream control input 150 may be responsive to the vehicle ignition being turned off in response to a lack of Bluetooth connection to the vehicle or the like. Thereafter, the mobile video surveillance device 100 may implement the video streaming control application 152 and the associated camera device 126 to start capturing video and stream the video to the surveillance system 200 and/or the video stream receiving computer 210 in response to the movement detection unit 182. For example, a user may place the mobile video surveillance device 100 at the desired location in their vehicle and may park the vehicle and turn off the ignition. Thereafter, the mobile video surveillance device 100 may operate in conjunction with the movement detection unit 182 to capture video and stream the video to the surveillance system 200 and/or the video stream receiving computer 210 in response to the movement detection unit 182.

In one aspect, the mobile video surveillance device 100 may be located in a vehicle and the video stream control input 150 may be responsive to a lack of a signal from a vehicle electronic key. Thereafter, the mobile video surveillance device 100 may implement the video streaming control application 152 and the associated camera device 126 to start capturing video and stream the video to the surveillance system 200 and/or the video stream receiving computer 210 in response to the movement detection unit 182. For example, a user may place the mobile video surveillance device 100 at the desired location in their vehicle and may park the vehicle and leave with the electronic key. Thereafter, the mobile video surveillance device 100 may operate in conjunction with the movement detection unit 182 to capture video and stream the video to the surveillance system 200 and/or the video stream receiving computer 210 in response to the movement detection unit 182.

Additionally, the video stream control input 150 in conjunction with the video streaming control application 152 may include predetermined or customized settings to delay operation. For example, a user may place the mobile video surveillance device 100 at the desired location and actuate the video stream control input 150. The mobile video surveillance device 100 may delay operation so that the user may leave the desired location without the mobile video surveillance device 100 operating. Thereafter, the mobile video surveillance device 100 may operate in conjunction with the movement detection unit 182 to capture video and stream the video to the surveillance system 200 and/or the video stream receiving computer 210 in response to the movement detection unit 182.

In one aspect, operating the video stream control input 150 may implement the video streaming control application 152 and the associated camera device 126 to immediately start capturing video and stream the video to the video stream receiving computer 210.

In one aspect, operating the video stream control input 150 may be responsive to a signal received from the wireless device 400 to implement the video streaming control application 152 and the associated camera device 126 to immediately start capturing video and stream the video to the surveillance system 200 and/or the video stream receiving computer 210.

In one aspect, operating the video stream control input 150 may be responsive to a signal received from the surveillance system 200 to implement the video streaming control application 152 and the associated camera device 126 to immediately start capturing video and stream the video to the surveillance system 200 and/or the video stream receiving computer 210.

The video stream control input 150 may be a button, switch, touch sensitive area, a signal from the surveillance system 200, a signal from the wireless device 400, and/or the like. In one aspect the video stream control input 150 may be a button. In one aspect the video stream control input 150 may be a button that is recessed into mobile video surveillance device 100 to limit inadvertent pressing. In one aspect, the video stream control input 150 may operate in conjunction with the video streaming control application 152. In one aspect, the video stream control input 150 may operate in conjunction with the user interface 130. In one aspect, the video stream control input 150 may be implemented as a button that is responsive to a single click, a double-click, a triple click, an extended hold or pressing, and/or the like.

In one aspect, the video stream control input 150 may be associated with a particular application stored on the mobile video surveillance device 100 and implemented in conjunction with the video streaming control application 152 as described in further detail below. In one aspect, the video stream control input 150 may be implemented with the audio input/output device 122 that may include microphones, microphone inputs, and the like, for receiving sound inputs.

In one aspect, the video stream control input 150 may be implemented as a doorbell button and the video streaming control application 152 may be responsive to an individual pressing the doorbell implementation of the video stream control input 150. In one aspect, the doorbell implementation of the video stream control input 150 may implement the mobile video surveillance device 100 to operate and initiate a videoconference between mobile video surveillance device 100 and the wireless device 400. In one aspect, the doorbell implementation of the video stream control input 150 may implement the mobile video surveillance device 100 to operate and initiate an audio conference between mobile video surveillance device 100 and the wireless device 400.

In this aspect, the video stream control input 150 may be initiated by voice recognition from the user. For example, the user may provide a voice command of "turn on," "stream," and/or the like for example, that may be interpreted by voice recognition software implemented by the mobile video surveillance device 100 to implement video streaming. Other types of word-based commands are contemplated as well, along with a number of other associated types of functionality.

In one aspect, the audio input/output device 122 may include microphones, microphone inputs, and the like, for receiving sound inputs. In particular, the audio input/output device 122 may detect unusual or specific sounds (unusual activity) by the user suggesting an event that should be subject to video streaming by the mobile video surveillance device 100. The unusual or specific sounds may include shouting, yelling, loud voices, gunshots, and the like. In one aspect, the video streaming control application 152 may implement video streaming when the unusual or specific sounds are detected. In one aspect, the audio input/output device 122 may be implemented as a sound detection unit 186. In one aspect, the sound detection unit 186 may be implemented as a separate device that may include an analog to digital converter.

In one aspect, operating the video stream control input 150 may implement the video streaming control application 152 and the associated camera device 126 to start capturing video and stream the video to the surveillance system 200 and/or the video stream receiving computer 210 in response to the sound detection unit 186. For example, a user may place the mobile video surveillance device 100 at the desired location and actuate the video stream control input 150. Thereafter, the mobile video surveillance device 100 may operate in conjunction with the sound detection unit 186 to capture video and stream the video to the surveillance system 200 and/or the video stream receiving computer 210 in response to the sound detection unit 186.

Additionally, the video stream control input 150 in conjunction with the video streaming control application 152 may include predetermined or customized settings to delay operation. For example, a user may place the mobile video surveillance device 100 at the desired location and actuate the video stream control input 150. The mobile video surveillance device 100 may delay operation so that the user may leave the desired location without the mobile video surveillance device 100 operating. Thereafter, the mobile video surveillance device 100 may operate in conjunction with the sound detection unit 186 to capture video and stream the video to the surveillance system 200 and/or the video stream receiving computer 210 in response to the sound detection unit 186.

The computer readable medium 128 may be configured to store the video streaming control application 152. For the purposes of this disclosure, the computer readable medium 128 stores computer data, which may include computer program code that may be executable by the processor 114 of the mobile video surveillance device 100 in machine readable form. By way of example, and not limitation, the computer readable medium 128 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 128 or machine readable medium, which may be incorporated into a computer program product.

The mobile video surveillance device 100 may include a SIM card 140 used for authentication of mobile video surveillance device 100 for wireless service. In particular, the SIM card 140 may be utilized in order to authenticate the mobile video surveillance device 100 on a particular wireless service provider. The SIM card 140 may be a generally rectangular flat form factor card having a first surface and opposing second surface. The SIM card 140 may include at least one removable subscriber identity module (SIM) arranged in the generally rectangular flat form factor card defined by the first surface. The SIM card 140 may include a SIM card memory for storing at least a SIM card serial number, for example, an Integrated Circuit Card ID (IC-CID). A mobile video surveillance device 100 not utilizing a SIM card is contemplated as well for use with the disclosure.

According to another aspect of the disclosure, the mobile video surveillance device 100 and/or the video stream receiving computer 210 may estimate the location of the mobile video surveillance device 100 based, at least in part, on a location determination device 184 that may utilize a global navigation satellite system (GNSS). In another aspect, a network operator cloud 34 may implement location determination based on a specific cell in which the mobile video surveillance device 100 connects. In yet another aspect, a network operator cloud 34 may obtain location determination based on triangulation with respect to a plurality of cells in which the mobile video surveillance device 100 receives signals.

In some aspects, the mobile video surveillance device 100 may include a display 118, a user interface 130, and the like. The display 118 may be a liquid crystal display having a backlight to illuminate the various color liquid crystals to provide a colorful display. The user interface 130 may be any type of physical input having one or more buttons, switches, and the like and/or may be implemented as a touchscreen 180. In one aspect, the mobile video surveillance device 100 may be implemented as a wireless phone or the like configured to provide the additional functionality as defined herein.

The mobile video surveillance device 100 may further include in the memory 116 or separate from the memory 116, a computer readable medium 128, an operating system 148, a communication component 146, a contact/motion component 158, a touchscreen controller 156, a graphics component 154 and the like. The operating system 148 together with the various components providing software functionality for each of the components of the mobile video surveillance device 100. The mobile video surveillance device 100 may further include a read-only memory 124 (ROM) and a power supply 112 such as a battery.

The touchscreen 180 of the disclosure may be implemented in the display 118 and may detect a presence and location of a touch of a user within the display area. For example, touching the display 118 of the mobile video surveillance device 100 with a finger or hand. The touchscreen 180 may also sense other passive objects, such as a stylus.

In operation, the display 118 may display various objects associated with applications for execution by the processor 114. In this regard, a user may touch the display 118, and in particular the touchscreen 180, to interact with the objects. For example, touching an object may execute an application in the processor 114 associated with the object that is stored in memory 116. Additionally or alternatively, touching an object may open a menu of options to be selected by the user. The display 118 may include a plurality of the objects for the user to interact with. Moreover, the display 118 may include a plurality of screens. The display 118 showing one screen at a time. The user may interact with the display 118 to move a screen into view on the display 118. Various objects may be located in the each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

FIG. 3 illustrates a front view of an exemplary mobile video surveillance device in accordance with aspects of the disclosure.

In particular, FIG. 3 illustrates a front panel of the mobile video surveillance device 100 in accordance with aspects of the disclosure. In particular, FIG. 3 illustrates a front panel 202 of the mobile video surveillance device 100. The front panel 202 may further include the camera device 126 and the lens 206. In one aspect, the front panel 202 may be a generally flat surface.

FIG. 3 further illustrates the video stream control input 150 implemented as a button arranged on the front panel 202. However, the video stream control input 150 may be located elsewhere and implemented differently as described herein. FIG. 3 further illustrates the video stream control input 150 implemented as a speaker 212 arranged on the front panel 202. In some aspects, the front panel 202 may include the display 118 and a graphical user interface 204 that may implement the touchscreen 180.

The mobile video surveillance device 100 may further include a housing 246. In one aspect, the housing 246 may be hermetically sealed to prevent intrusion of foreign objects. In one aspect, the housing 246 may be waterproof to prevent intrusion of water. In one aspect, the housing 246 may be watertight to prevent intrusion of water. In this regard, the housing 246 may include one or more seals, gaskets, adhesive, waterproof coating, potting materials, and the like. These aspects may be beneficial when utilizing the mobile video surveillance device 100 in outdoor environments for protection thereof.

In one aspect, the housing 246 may include or may connect to a mounting structure 248. The mounting structure 248 may be configured for mounting to any one of the above noted locations and positioned to capture video and/or audio. The mounting structure 248 may include suction cups, Velcro, clips, brackets, magnetic components, and/or the like.

Figure 4:
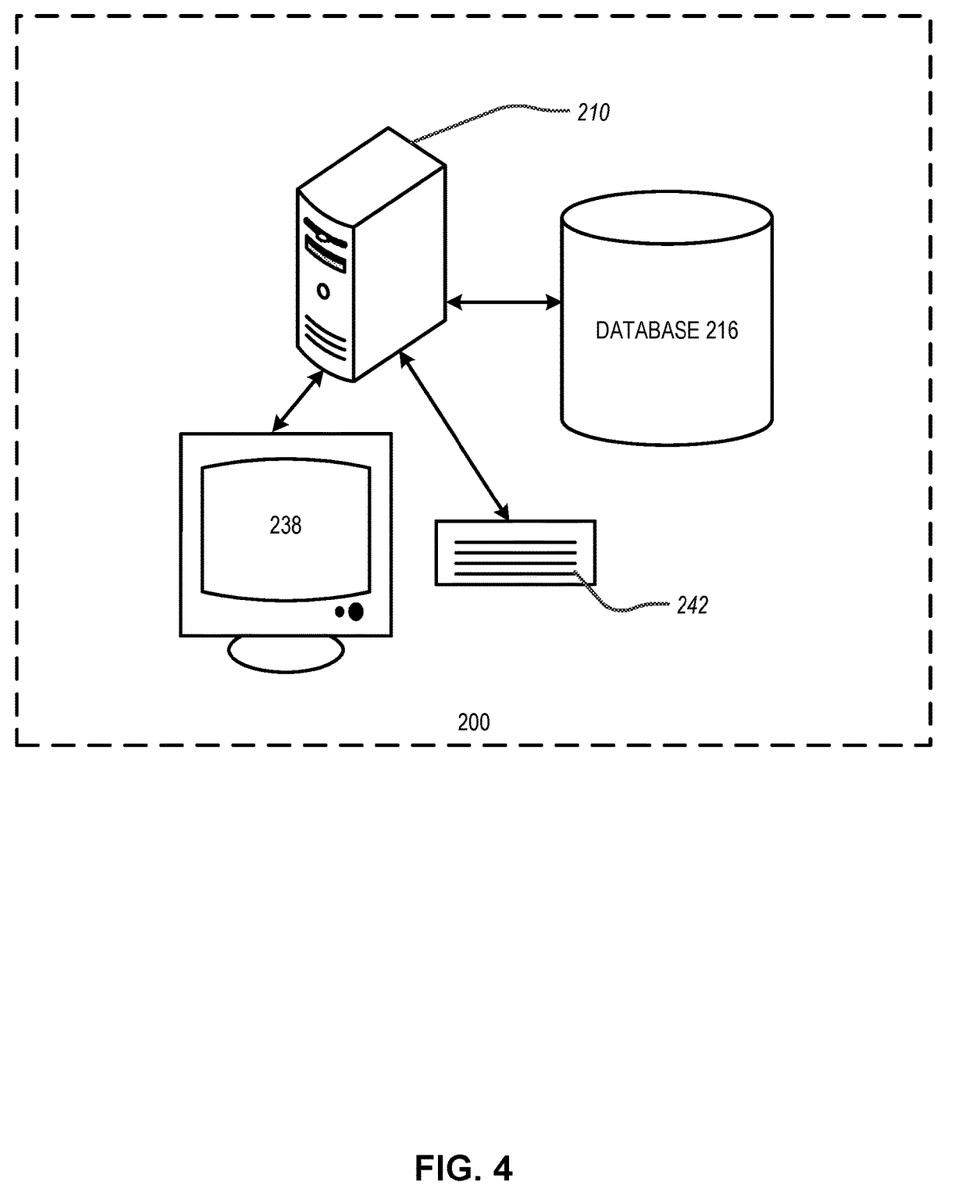
FIG. 4 illustrates a surveillance system in accordance with aspects of the disclosure.

FIG. 4 illustrates a surveillance system in accordance with aspects of the disclosure.

The surveillance system 200 may include a video stream receiving computer 210. The video stream receiving computer 210 may further communicate over the Internet 40 and/or the network operator cloud 34 to the mobile video surveillance device 100. In one aspect, the video stream receiving computer 210 may implement web-based communications and commands. In one aspect, the video stream receiving computer 210 may be implemented by a server.

The surveillance system 200 may include a database 216. The video stream receiving computer 210 may be configured to receive video stream content over the Internet 40, directly from the network operator cloud 34, from the wireless access point 12, and/or another network 18 via a communication channel as defined herein. The video stream receiving computer 210 may be configured to store the video stream content in the database 216. The video stream receiving computer 210 may also be configured to display the streamed video on a display 238. The display 238 may be any type of electronic display configured to display video content.

The surveillance system 200 may be implemented in proximity to the video stream receiving computer 210. On the other hand, the surveillance system 200 may be connected over network to the video stream receiving computer 210. Moreover, the surveillance system 200 may be implemented in proximity to a first implementation of the video stream receiving computer 210; and the surveillance system 200 may be connected over network to a second implementation of the video stream receiving computer 210. In this regard, the video stream receiving computer 210 may be implemented in a user's home, may be implemented in a trucking enterprise, a delivery enterprise, or the like.

The video stream receiving computer 210 may be configured to transmit commands to the mobile video surveillance device 100 through input device 242 such as a keyboard. The commands may include initiation of video streaming, the stopping of video streaming, location requests, and the like. The video stream receiving computer 210 may be configured to further send messages, text messages, email messages, alerts, and the like to the wireless device 400 associated with the user. In one aspect the video stream receiving computer 210 may be configured to further send messages, text messages, email messages, alerts, and the like to the wireless device 400 associated with the user in conjunction with a video streaming reception application 452 as described in further detail below. The video stream receiving computer 210 may be configured to further receive messages, text messages, email messages, alerts, locations, and the like from the mobile video surveillance device 100 and/or the wireless device 400. In one aspect, the wireless device 400 may be configured to operate with all of the functionality of the surveillance system 200. In various aspects of the disclosure, the surveillance system 200 may not be utilized in lieu of implementation with the wireless device 400

Figure 5:
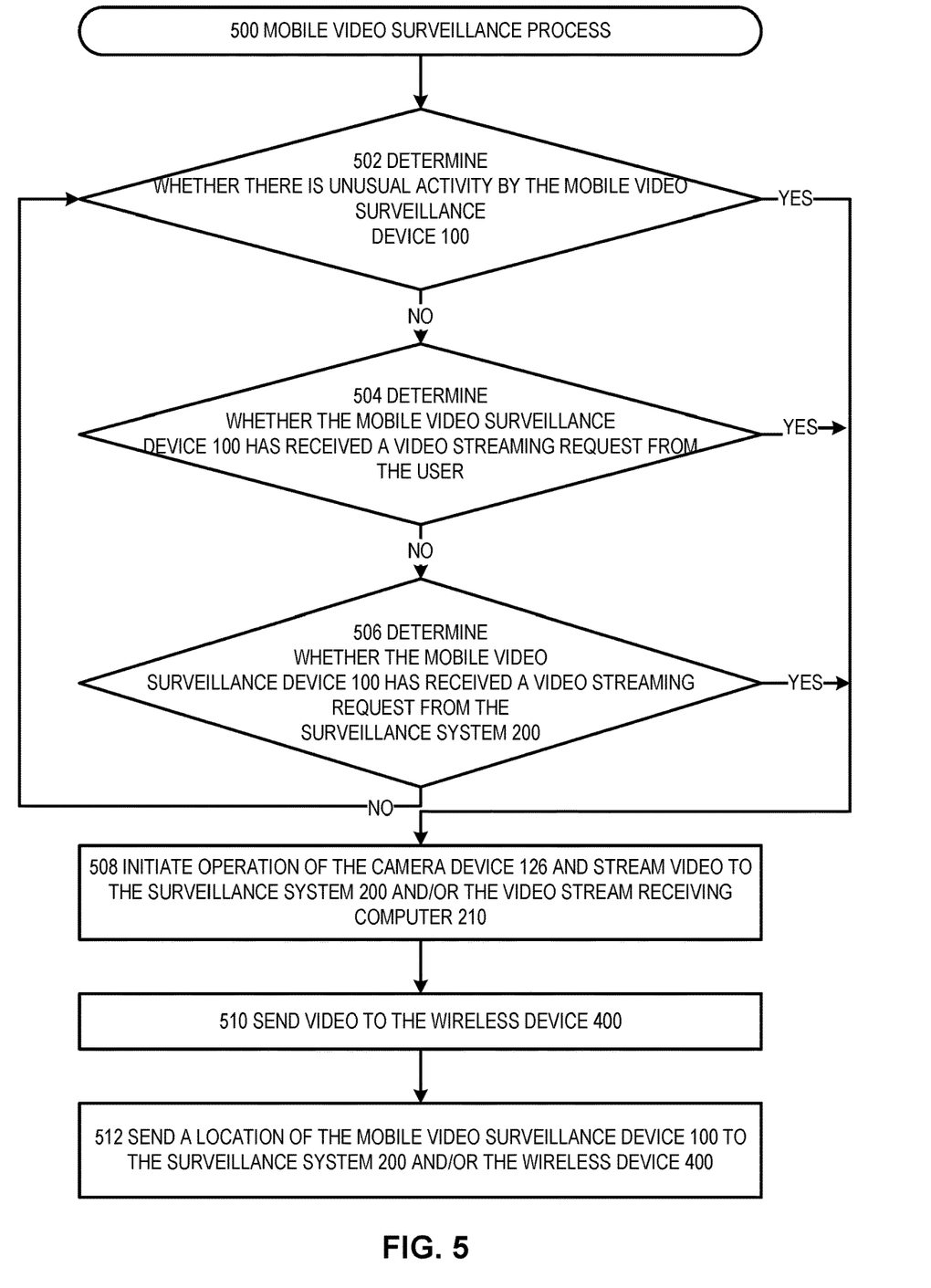
FIG. 5 illustrates a process of operating the mobile video surveillance device in accordance with aspects of the disclosure.

FIG. 5 illustrates a process of operating the mobile video surveillance device 100 in accordance with aspects of the disclosure. In particular, FIG. 5 illustrates a mobile video surveillance process 500 that may be implemented by the mobile video surveillance device 100.

It should be noted that the mobile video surveillance process 500 is merely exemplary and may be modified consistent with the various aspects disclosed herein. In particular, the mobile video surveillance process 500 may be performed in a different order consistent with the aspects described herein. Moreover, the mobile video surveillance process 500 may be modified to have more or fewer processes consistent with the various aspects disclosed herein.

The mobile video surveillance process 500 may include determining whether there is unusual movement (unusual activity) by the mobile video surveillance device 100 (Box 502). In this regard, the mobile video surveillance process 500 may implement any one or more the features as described herein. For example, the movement detection unit 182, as described above, can determine whether there is unusual movement (unusual activity) by the mobile video surveillance device 100. In particular, the movement detection unit 182 may detect a movement indicating unusual movement suggesting an event that should be subject to video streaming by the mobile video surveillance device 100. If the movement detection unit 182 detects an unusual movement, the mobile video surveillance process 500 advances to box 508. Otherwise, if the movement detection unit 182 does not detect an unusual movement, the mobile video surveillance process 500 advances to box 504.

Alternatively or additionally, box 502 can determine whether there are unusual sounds around the mobile video surveillance device 100 (unusual activity). In particular, the audio input/output device 122 may detect a sound indicating unusual activity by the mobile video surveillance device 100 suggesting an event that should be subject to video streaming by the mobile video surveillance device 100. The sound may include shouting, yelling, loud voices, gunshots, and the like. If the audio input/output device 122 detects an unusual sound, the mobile video surveillance process 500 advances to box 508. Otherwise, if the audio input/output device 122 does not detect an unusual sound, the mobile video surveillance process 500 advances to box 504.

The mobile video surveillance process 500 may include determining whether the mobile video surveillance device 100 has received a video streaming request from the user. (Box 504). In this regard, the mobile video surveillance process 500 may implement any one or more the features as described herein.

In box 504, the process determines whether the mobile video surveillance device 100 has received a video streaming request from the user from the wireless device 400. In one aspect, the request from the wireless device 400 may be a signal sent over a communication channel as defined herein. In one aspect, the request from the wireless device 400 may operate in conjunction with the video streaming reception application 452, the user interface 430, and/or the like.

The request may be sent in response to operation of a button, a switch, a touch sensitive area, a voice command, and/or the like provided to the wireless device 400. In one aspect, the request may be sent in response to operation of a button implemented by the wireless device 400. In one aspect, the request may be sent in response to operation of a speaker and the audio input/output device 422 of the wireless device 400 so as to receive voice commands. In one aspect, the request may be sent in response to operation of the user interface 430 of the wireless device 400. In one aspect, the request may be sent in response to operation of a particular application stored on the wireless device 400 and implemented in conjunction with the video streaming reception application 452. If a request has been received, the mobile video surveillance process 500 advances to box 508. Otherwise, if there is no request, the mobile video surveillance process 500 advances to box 506.

The mobile video surveillance process 500 may include determining whether the mobile video surveillance device 100 has received a video streaming request from the surveillance system 200 (Box 506). In this regard, the mobile video surveillance process 500 may implement any one or more the features as described herein.

In box 506, the mobile video surveillance process 500 determines whether the mobile video surveillance device 100 has received a video streaming request from the surveillance system 200. In this regard, the surveillance system 200 may determine that the mobile video surveillance device 100 requires real-time video streaming for a particular situation. Accordingly, the surveillance system 200 can initiate a video stream request in the video stream receiving computer 210. This video stream request may be sent to the mobile video surveillance device 100 over one or more of the Internet 40, network operator cloud 34, wireless access point 12, and/or network 18 on a communication channel as defined herein. If video stream request has been received, the mobile video surveillance process 500 advances to box 508. Otherwise, if there is no video stream request the mobile video surveillance process 500 advances back to box 502.

The mobile video surveillance process 500 may include initiating operation of the camera device 126 and streaming video to the surveillance system 200 and/or the video stream receiving computer 210 (Box 508). In this regard, the mobile video surveillance process 500 may implement any one or more the features as described herein.

In box 508, the mobile video surveillance device 100 may initiate operation of the camera device 126 and stream video to the surveillance system 200 and/or the video stream receiving computer 210. In one aspect, the video streaming control application 152 and the associated camera device 126 may start capturing video and stream the video to the surveillance system 200 and/or the video stream receiving computer 210 as described above.

The mobile video surveillance process 500 may include sending video to the wireless device 400 (Box 510). In this regard, the mobile video surveillance process 500 may implement any one or more the features as described herein.

In box 510, the mobile video surveillance device 100 may send the video to the wireless device 400. In this regard, the mobile video surveillance device 100, the transceiver 120, the camera device 126, the surveillance system 200, the video stream receiving computer 210, and/or the like may transmit video to the wireless device 400. Thereafter, the video may be displayed on the display 418 of the wireless device 400 in response to the video streaming reception application 452.

The mobile video surveillance process 500 may include sending a location of the mobile video surveillance device 100 to the surveillance system 200 and/or the wireless device 400 (Box 512). In this regard, the mobile video surveillance process 500 may implement any one or more the features as described herein.

In box 512 the mobile video surveillance device 100 may send a location of the mobile video surveillance device 100 to the surveillance system 200 and/or the wireless device 400. In this regard, the mobile video surveillance device 100, the transceiver 120, the location determination device 184, the surveillance system 200, the video stream receiving computer 210, and/or the like may transmit the location to the wireless device 400. Thereafter, the location may be displayed on the display 418 of the wireless device 400 in response to the video streaming reception application 452.

In this regard, the mobile video surveillance device 100 and/or the video stream receiving computer 210 may estimate the location of the mobile video surveillance device 100 based, at least in part, on the location determination device 184 that may utilize a global navigation satellite system (GNSS). In another aspect, a network operator cloud 34 may implement location determination based on a specific cell in which the mobile video surveillance device 100 connects. In yet another aspect, a network operator cloud 34 may obtain location determination based on triangulation with respect to a plurality of cells in which the mobile video surveillance device 100 receives signals. Additionally, the mobile video surveillance device 100 may send the location of the mobile video surveillance device 100 to the surveillance system 200 at any point in time as requested by the surveillance system 200.

Figure 6:
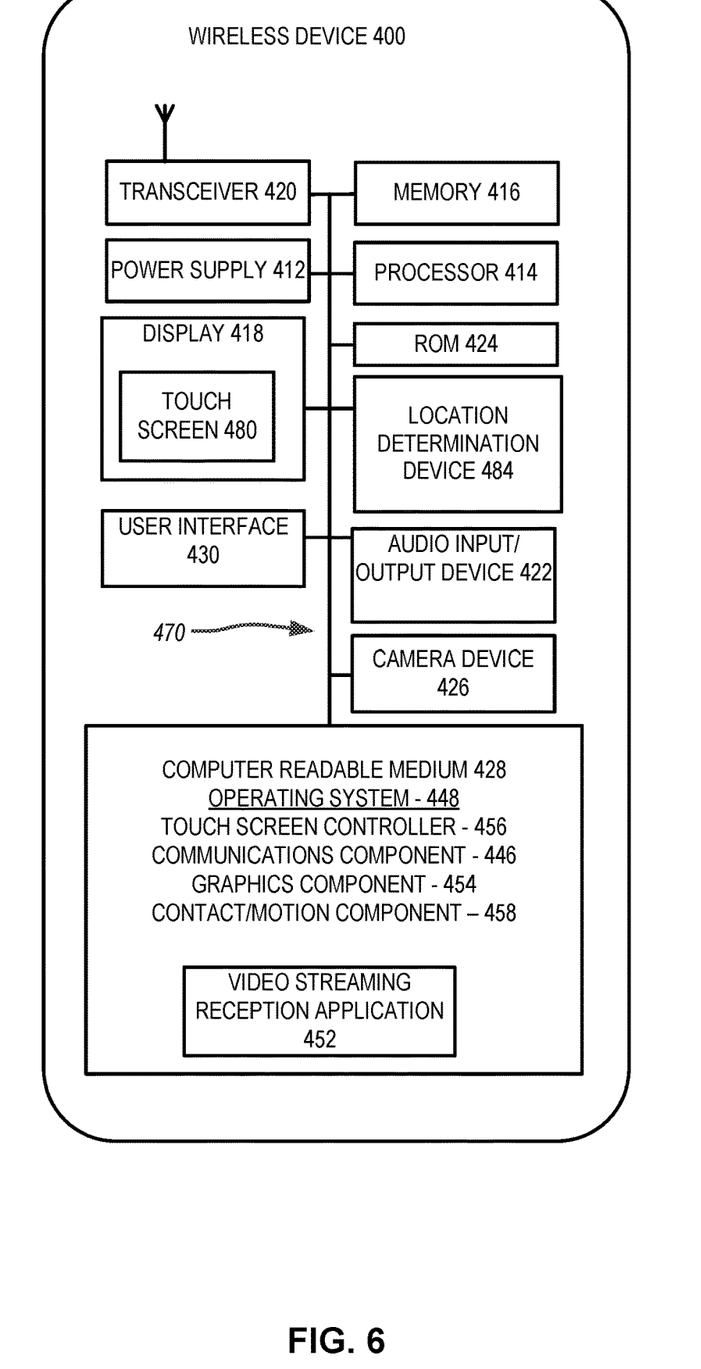
FIG. 6 illustrates a schematic of an exemplary wireless device with associated components, in accordance with aspects of the present disclosure.

FIG. 6 illustrates a schematic of an exemplary wireless device with associated components, in accordance with aspects of the present disclosure.

In particular, FIG. 6 illustrates the wireless device 400 that may interact with the mobile video surveillance device 100, the surveillance system 200, the network operator cloud 34, and/or the like. The wireless device 400 may include a processor 414, a memory 416, a display 418, a user interface 430, and the like. The wireless device 400 may include the video streaming reception application 452 configured to receive video and/or audio from the mobile video surveillance device 100, the surveillance system 200, and/or the video stream receiving computer 210.

In one aspect, the video streaming reception application 452 may operate in conjunction with the user interface 430, a button, switch, touch sensitive area, or the like. In one aspect, the video streaming reception application 452 may be implemented as a button that is responsive to a single click, a double-click, a triple click, an extended hold or pressing, and/or the like. In one aspect, the video streaming reception application 452 may be responsive to an audio input/output device 422 that may include microphones, microphone inputs, and the like, for receiving sound inputs. In this aspect, the video streaming reception application 452 may be initiated by voice recognition from the user. For example, the user may provide a voice command of "view stream," for example, that may be interpreted by voice recognition software implemented by the wireless device 400 to initiate video streaming. Other types of word-based commands are contemplated as well, along with a number of other associated types of functionality.

In one aspect, the video streaming reception application 452 may implement viewing of the video when the unusual or specific movement is detected by the mobile video surveillance device 100. The data associated with an unusual movement detected by the mobile video surveillance device 100 may be forwarded to the wireless device 400 in conjunction with the video streaming reception application 452, the surveillance system 200, the video stream receiving computer 210, or the like. Thereafter, the transceiver 420 may receive the data associated with unusual movement over a network. The video streaming reception application 452 may implement various aspects of the disclosure including the mobile video surveillance process 500 illustrated in FIG. 5.

In one aspect, the video streaming reception application 452 may generate a notification, a pop-up notification, and/or like notification on the wireless device 400 when the unusual or specific movement is detected by the mobile video surveillance device 100. In this regard, a user tapping the notification may initiate the video streaming reception application 452 to implement viewing of the video when the unusual or specific movement that was detected by the mobile video surveillance device 100.

The processor 414 may be a central processing unit, microprocessor, dedicated hardware, or the like configured to execute instructions including instructions related to software programs. The display 418 may be a liquid crystal display having a backlight to illuminate the various color liquid crystals to provide a colorful display. The user interface 430 may be any type of physical input having one or more buttons, switches, and the like and/or may be implemented as a touchscreen 480.

The wireless device 400 may further include in the memory 416 or separate from the memory 416, a computer readable medium 428, an operating system 448, a communication component 446, a contact/motion component 458, a touchscreen controller 456, a graphics component 454 and the like. The operating system 448 together with the various components providing software functionality for each of the components of the wireless device 400. The wireless device 400 may further include a read-only memory 424 (ROM) and a power supply 412 such as a battery.

The memory 416 may include a high-speed random-access memory. Also, the memory 416 may be a non-volatile memory, such as magnetic fixed disk storage, flash memory or the like. The various components of the wireless device 400 may be connected through various communication lines including a data bus 470.

Additionally, the wireless device 400 may include the audio input/output device 422. The audio input/output device 422 may include speakers, speaker outputs, and in the like, providing sound output; and may include microphones, microphone inputs, and the like, for receiving sound inputs. The audio input/output device 422 may include an analog to digital converter and a digital to audio converter for audio input and output functions respectively.

The wireless device 400 may include a transceiver 420 and the like. The transceiver 420 may provide radio and signal processing as needed to access a network for services over a communication channel as defined herein. The processor 414 and the transceiver 420 may be configured to receive and process video streaming, call functions, data transfer, and the like and provide other services to the user.

The touchscreen 480 of the disclosure may be implemented in the display 418 and may detect a presence and location of a touch of a user within the display area. For example, touching the display 418 of the wireless device 400 with a finger or hand. The touchscreen 480 may also sense other passive objects, such as a stylus.

In operation, the display 418 may display various objects associated with applications for execution by the processor 414. In this regard, a user may touch the display 418, and in particular the touchscreen 480, to interact with the objects. For example, touching an object may execute an application in the processor 414 associated with the object that is stored in memory 416. Additionally or alternatively, touching an object may open a menu of options to be selected by the user. The display 418 may include a plurality of the objects for the user to interact with. Moreover, the display 418 may include a plurality of screens. The display 418 showing one screen at a time. The user may interact with the display 418 to move a screen into view on the display 418. Various objects may be located in the each of the screens.

The touchscreen 480 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The wireless device 400 may include a camera device 426. The camera device 426 can include one or more cameras to provide visual input. The wireless device 400 can include, for example, one camera device 426 on the back side of the wireless device 400 and another camera device 426 on the front side of the wireless device 400.

The computer readable medium 428 may be configured to store the video streaming reception application 452. For the purposes of this disclosure, the computer readable medium 428 stores computer data, which may include computer program code that may be executable by the processor 414 of the wireless device 400 in machine readable form. By way of example, and not limitation, the computer readable medium 428 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 428 or machine readable medium, which may be incorporated into a computer program product.

According to another aspect of the disclosure, the wireless device 400 may estimate the location of the wireless device 400 based, at least in part, with a location determination device 484 that may operate based on a global navigation satellite system (GNSS). In another aspect, a network operator cloud 34 may implement location determination based on a specific cell in which the wireless device 400 connects. In yet another aspect, a network operator cloud 34 may obtain location determination based on triangulation with respect to a plurality of cells in which the wireless device 400 receives signals.

The wireless device 400 may include a SIM card used for authentication of the wireless device 400 for wireless service. In particular, the SIM card may be utilized in order to authenticate the wireless device 400 on a particular wireless service provider. The SIM card may be a generally rectangular flat form factor card having a first surface and opposing second surface. The SIM card may include at least one removable subscriber identity module (SIM) arranged in the generally rectangular flat form factor card defined by the first surface. The SIM card 140 may include a SIM card memory for storing at least a SIM card serial number, for example, an Integrated Circuit Card ID (ICCID). A wireless device 400 not utilizing a SIM card is contemplated as well for use with the disclosure.

Accordingly, the disclosure has described a mobile video surveillance system that provides greater security in that it can stream video in real time to a wireless device or computer implemented by an individual or entities such that these other individuals or entities may take appropriate action based on the content of the video. In this regard, the mobile video surveillance system set forth in the disclosure may deter crime and/or identify individuals involved in criminal behavior like theft, vandalism, and/or the like. Moreover, the disclosure has described how the mobile video surveillance system in some aspects may be automatic based on environmental sounds and actions sensed by the mobile video surveillance device. Additionally, the disclosure has described how the mobile video surveillance system may be remotely actuated, which is beneficial as the user of the mobile video surveillance device may not always be in a position to initiate video streaming. Moreover, the disclosure has described how the mobile video surveillance system of the disclosure may stream video to a remote location which results in a more robust storage of the video content which is not subject to loss if the mobile video surveillance device is damaged, stolen, lost, or the like. Additionally, the disclosure has described how the mobile video surveillance system of the disclosure may stream video utilizing broadband wireless service that has few geographic limitations.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

The video streaming control application 152 and/or the video streaming reception application 452 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem. The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the device.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages and ringtones. MMS can be used within the context of the present disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The terms data, wireless data, wireless broadband data, and the like as utilized herein includes mobile broadband or wireless Internet access delivered through mobile phone towers over a communication channel as defined herein to computers, mobile phones, wireless devices, the mobile video surveillance device 100 and other digital devices as defined herein using portable modems. Some mobile services allow more than one device to be connected to the Internet using a single cellular connection using a process called tethering.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A mobile surveillance device, comprising:
 a set of sensors configured to output a plurality of data;
 a mounting structure configured to removably couple a housing of the sensor set at a plurality of different locations, comprising a building or vehicle, one of the removable couplings being performed at one of the locations using at least one of a suction cup, Velcro™, clip, bracket, or magnetic component;
 a transceiver configured to emit the data over a wireless network to a receiving computer for at least one of the following: viewing on a display, viewing on a wireless device, or storage in a database, wherein the emission comprises a stream that one or more other wireless networks is unable to emit to the receiving computer based on one or more geographic features near the one location;
 a capturing input device configured to receive an input signal to operate at least one of the sensor set and to initiate the emission;
 a processor configured to:
  obtain detection information from an output of the at least one sensor configured to detect a movement of an object different from the mobile surveillance device;
  determine whether the detected movement is specified as unusual based on the obtained detection information and the one location respectively satisfying a plurality of criteria; and
  responsive to the specification of the detected movement as unusual, emit the input signal to the capturing input device; and
 the housing configured to house the sensor set, the transceiver, the capturing input device, and the processor.

2. The mobile surveillance device according to claim 1 wherein the transceiver is configured to perform the emission via wireless broadband data service.

3. The mobile surveillance device according to claim 1, wherein the sensor set comprises one of the following: a passive infrared (PIR) sensor, a microwave sensor, an ultrasonic transducer, an electric eye, or a tomographic motion detector.

4. The mobile surveillance device according to claim 1 further comprising a SIM card configured for authentication of wireless service.

5. The mobile surveillance device according to claim 1, wherein the processor is further configured to determine presence of a specific sound; and
 wherein the specification of the detected movement as unusual is further based on the determined presence of the specific sound.

6. The mobile surveillance device according to claim 5 wherein the specific sound comprises at least one of the following: shouting, yelling, loud voices, or gunshots.

7. The mobile surveillance device according to claim 1 further comprising:
 the capturing input device configured to receive a request by the transceiver,
 wherein the input signal is further emitted in response to receiving the request by the capturing input device.

8. The mobile surveillance device according to claim 1, further comprising:
 a location determination device configured to determine the one location and transmit the one location in response to at least one of the following: a request received, another request from the wireless device, or an operation of the capturing input device.

9. The mobile surveillance device according to claim 1, further comprising:
 a sensor configured to detect a movement of the housing, wherein the processor is further configured to initiate operation of the camera device and initiate video streaming by the transceiver in response to the detected movement of the housing;
 another sensor configured to detect sounds, the other sensor being further configured to determine a specific sound;
 the capturing input device comprising the sound detection unit, wherein the capturing input device and the processor are configured to initiate operation of the camera device and initiate video streaming by the transceiver in response to the sound detection unit; and
 the capturing input device configured to receive a request by the transceiver, wherein the initiated operation of the camera device and the initiated streaming by the transceiver in response to the detected movement of the housing are further in response to receiving the request, wherein the specific sound comprises at least one of the following: shouting, yelling, loud voices, or gunshots.

10. A system comprising the mobile surveillance device according to claim 1, and further comprising:
 the receiving computer configured to receive the emitted data;
 the display configured to display the stream to the receiving computer; and
 the database configured to store the stream at the receiving computer.

11. A system comprising the mobile surveillance device according to claim 1, and further comprising:
 a wireless device configured to receive the stream; and
 the wireless device including a display configured to display the stream at the receiving computer.

12. A process of implementing a mobile surveillance device, the process comprising:
 capturing a plurality of data with a set of sensors;
 configuring a housing for removably coupling the sensor set at a plurality of different locations with a mounting structure, the locations comprising a building or vehicle, one of the removable couplings being performed at one of the locations using at least one of a suction cup, Velcro™, clip, bracket, or magnetic component;

emitting the data over a wireless network to a receiving computer with a transceiver for at least one of the following: viewing on a display or storage in a database, wherein the emission comprises a stream that one or more other wireless networks is unable to emit to the receiving computer based on one or more geographic features near the one location;

receiving an input signal to operate at least one of the sensor set and to initiate the emission with a capturing input device;

obtaining, with a processor from an output of the at least one sensor configured to detect a movement of an object different from the mobile surveillance device, detection information;

determining whether the detected movement is specified as unusual based on the obtained detection information and the one location respectively satisfying a plurality of criteria;

responsive to the specification of the detected movement as unusual, emitting the input signal; and arranging the sensor set, the transceiver, the capturing input device, and the processor in the housing, wherein the capturing input device comprises an input device configured as at least one of the following: a button arranged on the housing and a touchscreen arranged in a display of the housing.

13. The process according to claim 12, wherein the transceiver is configured to emit the data via wireless broadband data service.

14. The process according to claim 12, wherein the sensor set comprises one of the following: a passive infrared (PIR) sensor, a microwave sensor, an ultrasonic transducer, an electric eye, or a tomographic motion detector.

15. The process according to claim 12, further comprising:
providing a SIM card configured for authentication of wireless service.

16. The process according to claim 12, further comprising:
detecting a specific movement of the housing, wherein the capturing input device is configured to be responsive to the detection to initiate operation of the camera device and initiate streaming by the transceiver.

17. The process according to claim 12, further comprising:
detecting, via another of the sensor set, one or more sounds;

determining a specific sound based on the one or more detected sounds, wherein the capturing input device comprises the other sensor; and wherein the capturing input device and the processor are configured to initiate operation of the camera device and initiate streaming by the transceiver in response to the determination of the specific sound.

18. The process according to claim 17 wherein the specific sound comprises at least one of the following: shouting, yelling, loud voices, or gunshots.

19. The process according to claim 12 further comprising:
receiving a request by the transceiver with the capturing input device, wherein the capturing input device and the processor are configured to initiate operation of the camera device and initiate video streaming by the transceiver in response to receiving the request.

20. The process according to claim 12 further comprising:
determining the one location of the mobile surveillance device with a location determination device and transmitting the one location of the mobile surveillance device in response to at least one of the following: a request received, another request from a wireless device, or an operation of the capturing input device.

21. The process according to claim 12 further comprising:
sensing a movement of the housing such that the processor determines a specific movement therefrom;

wherein the capturing input device and the processor are configured to initiate operation of the camera device and initiate streaming by the transceiver in response to the determined movement;

detecting sounds to determine a specific sound;

wherein the capturing input device comprises a sensor of the detected sounds, the initiations being further in response to the determined sound and reception of a request by the transceiver, and wherein the specific sound comprises at least one of the following: shouting, yelling, loud voices, or gunshots.

22. The process according to claim 12, further comprising:
receiving the emitted data with the receiving computer;

displaying the stream to the receiving computer on a display; and storing the stream at the receiving computer in the database.

* * * * *